UNITED STATES PATENT OFFICE 2,255,077

FILTER DYES FOR COLOR PHOTOGRAPHY

Edmund B. Middleton, Metuchen, N. J., assignor to Du Pont Film Manufacturing Corporation, New York, N. Y., a corporation of Delaware No Drawing. Application March 21, 1938, Serial No. 197,310

13 Claims. (Cl. 260—240)

This invention relates to a colored screening layer for photographic elements such as films and plates. The invention also relates to a colored coating material for use in forming a screening layer for light sensitive photographic films or plates. The invention also pertains to a new class of dyes suitable for use as a filter dye in multilayer films for three color photography. The invention also relates to processes of making the above mentioned materials.

This invention has for an object the production of new dyes which are useful in a screening layer in multilayer films for three color photography. A further object is the preparation of new screening dyes which do not sensitize or desensitize a photographic layer. A still further object is the preparation of a non-diffusing or non-bleeding screening dye for color film. Still other objects will appear hereinafter.

Film used for three color photography in general consists of a top layer of photographic emulsion which is sensitive to light within the blue region of the spectrum. Under this layer a minus blue dyed layer is interposed, then a photographic emulsion layer which is sensitive to blue and green light, then a clear gelatine layer, next a photographic emulsion which is sensitive to blue and red light, and finally a film base member.

The purpose of the minus blue (i. e. yellow) dye layer is to prevent blue light on exposure of the film from reaching the middle and bottom emulsion layers which are sensitive to blue plus green, and to blue plus red respectively. By reason of the screening layer, the middle and bottom layers will record only green and red respectively.

The above and other objects are accomplished by the following invention which comprises the preparation of new dyes hereinafter described, and their incorporation into screening layers light sensitive photographic color film.

The dyes of the present invention have the following general formula:

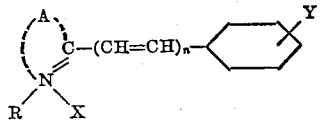

wherein R is an aliphatic straight chain hydrocarbon radical having from 12 to 20 carbon atoms, X is the negative radical of an acid, A represents the atoms necessary to complete a mononuclear heterocyclic mono-nitrogen radical of the type used in the preparation of cyanine dyes taken from the class consisting of pyridines, thiazolines, oxazolines, and selenazolines, $n$ is the integer 1 or 2, and Y is a substituent taken from the group consisting of OH, alkyl, alkoxy, methylenedioxy, alkylamino,

halogen, nitro and sulfonic.

In the above formula, for example, R may be dodecyl, tetradecyl, hexadecyl, octadecyl, olelyl, etc. radicals, X may be a halide, e. g. chloride, bromide, para-toluenesulfonate, alkyl-sulfate, chlorate, etc. radicals, Y may be methyl, ethyl, propyl, diethylamino, dimethylamino, ethylmethylamino, etc.

In a more limited sense which represents a preferred embodiment hereof the dyes have the following general formula:

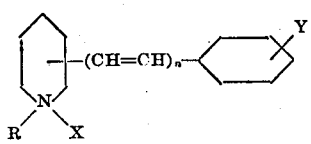

wherein R is an aliphatic straight chain hydrocarbon radical having from 12 to 20 carbon atoms and preferably 16 to 18 carbon atoms; X is the negative radical of an acid and preferably is a halogen atom, e. g. chlorine and bromine, and Y is a substituent taken from the class consisting of alkyl, alkoxy, methylenedioxy

halogen, nitro and sulfonic.

In preparing the preferred type of our new dyes, we may employ as starting materials compounds having the general formula:

(1) 

wherein R and X have the above significance which may be prepared by reacting an ester of a monohydric straight chain aliphatic alcohol with an inorganic acid, e. g. an alkyl bromide having 12 to 20 carbon atoms.

The compounds of formula (1) are thereupon reacted with an aldehyde having substituted in the para position a hydroxyl, alkyl, alkoxy, methylene dioxy,

halogen or sulfonic group, in the presence of an an acid binding agent or solvent, e. g. pyridine, piperidine, fused sodium acetate, tri-n-propylamine, triethanolamine, sodium methylate, caustic soda, etc. Solvents may also be employed with some of the agents, e. g. acetic anhydride with sodium acetate alcohol with alkali metal bases, for example.

The invention will be further illustrated but is not intended to be limited by the following examples:

Example I

N-dodecyl α (p-dimethylaminostyryl) pyridinium bromide

Two grams of alpha picoline and 5.3 grams of dodecyl bromide were mixed in a flask and heated in an oil bath for 5 hours at 120–140° C. Then 2.98 grams of p-dimethylaminobenzaldehyde, 25 cc. of absolute alcohol and 1 cc. of piperidine were added, and the whole heated to boiling under a reflux condenser for one hour. On concentrating and cooling an orange-yellow dye was recovered. The reactions are

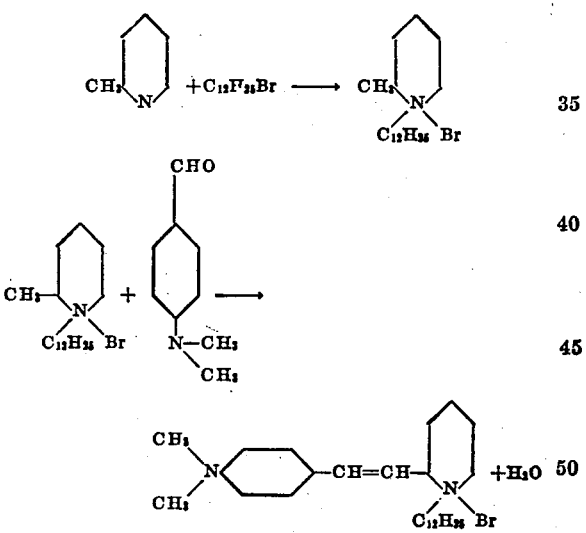

The dye, while sensitizing a silver chloride emulsion, has only a weak sensitizing action on silver bromide emulsion. It is a satisfactory yellow filter, and while not entirely removed by processing only a weak yellow shade remains. It does not bleed.

Example II

N-octadecyl α (p-hydroxystyryl) pyridinium bromide

Two grams of alpha picoline and 5.3 grams of dodecyl bromide were heated together for 5 hours at 120–140° C. Then 2.24 grams of p-hydroxybenzaldehyde, 25 cc. of alcohol and 1 cc. of piperidine are added. After boiling for 1 hour under a reflux condenser, concentrating and allowing to cool, a yellow dye is obtained. It is purified by recrystallization from alcohol.

It is completely decolorized by processing in the usual manner of processing film in color photography. It does not bleed. It does not affect a chloride emulsion and while it desensitizes a bromide emulsion, it remains in the gelatine filter layer and has little effect on the emulsion. It is a good yellow filter.

Example III

N-octadecyl α (p-dimethylaminostyryl) pyridinium bromide

Two grams of alpha picoline and 7 grams of octadecyl bromide were heated in an oil bath for 5 hours at 120° C. Then 3 grams of p-dimethylaminobenzaldehyde, 30 cc. of absolute alcohol and 2 cc. of piperidine were added and the solution was boiled for one hour under a reflux condenser. An orange-yellow dye resulted. It was allowed to precipitate from the cooled solution and recrystallized from alcohol and ether. It is a good filter dye, non-bleeding and sensitizes a bromide emulsion only slightly.

Example IV

N-octadecyl α (p-hydroxystyryl) pyridinium bromide

This was prepared in the same manner as the preceding example except that 2.25 grams of p-hydroxybenzaldehyde were used as the aldehyde. The compound is a good filter dye, is decolorized on processing and does not bleed.

Example V p-Dimethylaminostyryl thiazoline lauryl bromide

Two (2) grams of 2 methyl thiazoline and 5 grams of lauryl bromide were heated together for 3 hours at 140° C. Then 3 grams of p-dimethylaminobenzaldehyde, 2 cc. of piperidine and 25 cc. of alcohol were added. Refluxing was continued for one hour. On cooling and adding ether, an orange-yellow dye precipitated. It was purified by recrystallization from alcohol and ether.

Example VI p-Hydroxystyryl thiazoline dodecyl bromide

This dye was made in a manner similar to that of Example V except that 2.4 grams of p-hydroxybenzaldehyde were used instead of the 3 grams of dimethylamino-benzaldehyde. A pale yellow dye was obtained upon purification in a similar manner.

Example VII p-Dimethylaminostyryl thiazoline octadecyl bromide

This dye was made in a manner similar to that of Example V except that 6.6 grams of stearyl bromide were used instead of the 5 grams of lauryl bromide.

Example VIII

N-octadecyl α (4-piperonylbutadienyl) pyridinium bromide

Two (2) grams of alpha-picoline and 7 grams of stearyl bromide were heated together for 3 hours at 120–140° C. Then 3.8 grams of piperonyl-acrolein (described in Ber. 27, 2598) and 1 cc. of piperidine and 25 cc. of alcohol are added and the mixture is heated under a reflux condenser for one hour. On cooling and adding ether, a citron yellow dye is obtained. This is purified by dissolving in alcohol and precipitating with ether. The dye obtained forms an excellent minus blue filter and does not bleed. It may be bleached with ease.

In place of the specific heterocyclic nitrogen bases of the preceding examples, other mononuclear heterocyclic mononitrogen bases or the salts thereof which have a reactive methyl group in the α or γ position to the nitrogen atom may be used. The bases may be reacted with a salt forming compound previously or simultaneously with the condensation reaction. In the case of the oxazolines, and selenazolines, for instance, the corresponding bases or salts may be substituted for the thiazolines of Examples V, VI, and VII in similar amounts with equally good results.

In place of the specific aldehydes of the preceding examples, others which contain the above described substituents may be substituted with equally good results. As examples of such aldehydes, mention is made of piperonal m-nitrobenzaldehyde, veratric aldehyde, anisaldehyde, cuminic aldehyde, cinnamic aldehyde and m-nitrocinnamic aldehyde. Still other specific aldehydes will be obvious to those skilled in the art.

Colloidal suspensions of the above dyes may be made by incorporating the same into a solution of a colloid in water and/or an organic solvent. Gum arabic, starch or gelatin may be employed as the colloid; gelatin, however, is preferred. The solutions of a proper viscosity may be then coated upon the film in the usual manner to form a screening layer.

A mixture suitable for this purpose may be made by adding 0.4 of a gram of the dye of Example I to 1 kilogram of a gelatin solution of 10 per cent strength. The solution may be coated upon a film which contains a layer sensitive to blue and red light and a layer which is sensitive to blue and green light. Over the screening layer a layer which is sensitive to blue light may be supercoated. The resulting film is very suitable for three color photography.

This invention possesses the advantage that a new class of minus blue dyes useful in the production of color film may be easily prepared. The dyes are of particular value since they do not bleed or migrate from the filter layer into the photographic emulsion layers. The dyes are not soluble in weak alkali which also renders them of value in the art of photography. Another important property of the dyes is the fact that they may be readily decolorized or removed by a processing bath.

As many apparently widely different embodiments of this invention may be made without departing from the spirit and scope thereof, it is to be understood that I do not limit myself to the specific embodiments thereof except as defined in the appended claims.

I claim:

1. The new chemical compounds of the general formula:

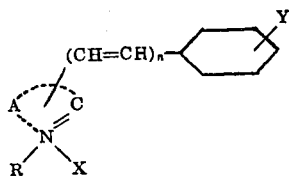

wherein R is an aliphatic straight chain hydrocarbon radical having from 12 to 20 carbon atoms, X is a negative radical of an acid, A represents the atoms necessary to complete a mononuclear heterocyclic nitrogen radical of the type used in the production of cyanine dyes taken from the class consisting of pyridines, thiazolines, oxazolines and selenazolines which are attached to the methenyl radical in a position taken from the group consisting of α and γ positions to the nitrogen atom, Y is a substituent taken from the group consisting of hydroxyl, alkyl, alkoxy, methylenedioxyl, alkylamino, N-dialkylamino, halogen, nitro and sulfonic acid radicals, and $n$ is a positive integer less than 3.

2. The new chemical compound of the general formula:

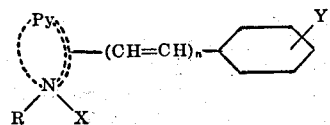

wherein R is an aliphatic straight chain hydrocarbon radical having from 12 to 20 carbon atoms, X is a negative radical of an acid,

is a pyridine nucleus attached to the methenyl radical in a position taken from the group consisting of α and γ positions to the nitrogen atom, Y is a substituent taken from the group consisting of hydroxyl, alkyl, alkoxy, methylenedioxyl, alkylamino, N-dialkylamino, halogen, nitro and sulfonic acid radicals, and $n$ is a positive integer less than 3.

3. The new products of the general formula:

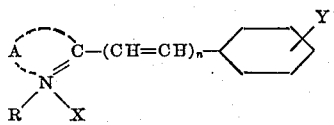

wherein R is an aliphatic straight chain hydrocarbon radical having from 12 to 20 carbon atoms, X is a negative radical of an acid, A represents the atoms necessary to complete a mononuclear heterocyclic mono-nitrogen radical of the type used in the production of cyanine dyes taken from the class consisting of pyridines, thiazolines, oxazolines, and selenazolines, Y is a substituent taken from the group consisting of hydroxyl, alkyl, alkoxy, methylenedioxyl, alkyl-amino, N-dialkylamino, halogen, nitro and sulfonic acid radicals, and $n$ is a positive integer less than 3.

4. The new products of the formula:

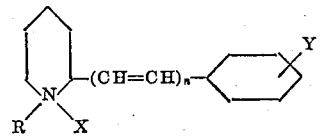

wherein R is an aliphatic straight chain hydrocarbon radical having from 12 to 20 carbon atoms; X is a negative acid radical, Y is a member of the group consisting of hydroxyl, alkyl, alkoxy, methylenedioxy, alkylamino, N-dialkylamino, halogen, nitro and sulfonic acid radicals, and $n$ is a positive integer less than 3.

5. The new products of the formula:

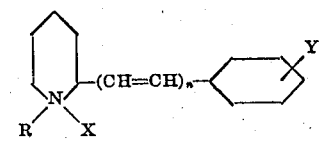

wherein R is an aliphatic straight chain hydrocarbon radical having from 12 to 20 carbon atoms; X is a halogen atom; and Y is a member of the group consisting of hydroxyl, alkyl, alkoxy, methylenedioxy, alkylamino, N-dialkylamino, halogen, nitro and sulfonic acid radicals, and $n$ is a positive integer less than 3.

6. The new products of the formula:

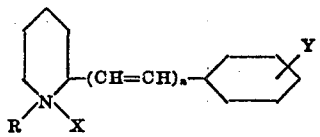

wherein R is a straight chain alkyl radical having from 12 to 20 carbon atoms; X is a halogen atom, Y is a member of the group consisting of hydroxyl, alkyl, alkoxy, methylenedioxy, alkylamino, N-dialkylamino, halogen, nitro and sulfonic acid radicals, and $n$ is a positive integer less than 3.

7. The new products of the formula:

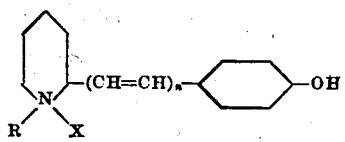

wherein R is a straight chain alkyl radical having 12 to 20 carbon atoms, X is a negative radical of an acid, and $n$ is a positive integer less than 3.

8. The new products of the formula:

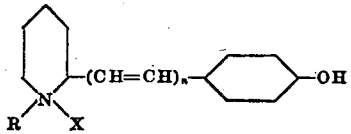

wherein R is a straight chain alkyl radical having 12 to 20 carbon atoms, X is a halogen atom, and $n$ is a positive integer less than 3.

9. The new products of the formula:

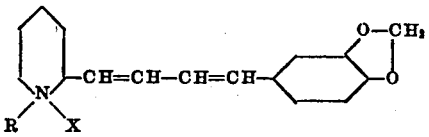

wherein R is a straight chain alkyl radical having 12 to 20 carbon atoms, X is a negative radical of an acid.

10. The new products of the formula:

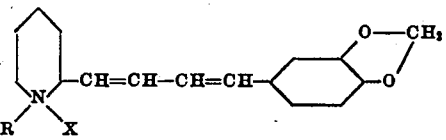

wherein R is a straight chain alkyl radical having 12 to 20 carbon atoms, and X is a halogen atom.

11. The chemical compound N-octadecyl$\alpha$(4-piperonylbutadienyl) pyridinium bromide.

12. The chemical compound N-octadecyl$\alpha$(p-hydroxystyryl) pyridinium bromide.

13. The chemical compound N-octadecyl$\alpha$(p-dimethylaminostyryl) pyridinium bromide.

EDMUND B. MIDDLETON.